(12) United States Patent
Hoff et al.

(10) Patent No.: US 9,254,536 B2
(45) Date of Patent: Feb. 9, 2016

(54) METHOD AND APPARATUS FOR CONTROLLED LASER ABLATION OF MATERIAL

(76) Inventors: Paul Hoff, Bedford, NH (US); Donald Ronning, Pelham, NH (US)

(*) Notice: Subject to any disclaimer, the term of this patent is extended or adjusted under 35 U.S.C. 154(b) by 319 days.

(21) Appl. No.: 12/800,554

(22) Filed: May 17, 2010

(65) Prior Publication Data

US 2010/0292679 A1 Nov. 18, 2010

Related U.S. Application Data

(60) Provisional application No. 61/216,306, filed on May 15, 2009.

(51) Int. Cl.
*A61N 5/06* (2006.01)
*B23K 26/40* (2014.01)
*B23K 26/00* (2014.01)
*B23K 26/06* (2014.01)

(52) U.S. Cl.
CPC ......... *B23K 26/4075* (2013.01); *B23K 26/0042* (2013.01); *B23K 26/0635* (2013.01); *B23K 2201/40* (2013.01)

(58) Field of Classification Search
CPC .. A61N 18/20; B23K 26/0635; B23K 26/381; B23K 26/401; B23K 26/4075; B23K 2201/40
See application file for complete search history.

(56) References Cited

U.S. PATENT DOCUMENTS

| | | |
|---|---|---|
| 5,177,764 A | 1/1993 | Nilsson |
| 5,326,426 A | 7/1994 | Tam et al. |
| 5,328,715 A | 7/1994 | Iacovangelo et al. |
| 5,518,956 A | 5/1996 | Liu et al. |
| 5,642,375 A | 6/1997 | King et al. |
| 5,656,186 A | 8/1997 | Mourou et al. |
| 6,055,262 A | 4/2000 | Cox et al. |
| 6,115,401 A | 9/2000 | Scobey et al. |
| 2003/0128497 A1 | 7/2003 | Allen et al. |
| 2005/0098546 A1 | 5/2005 | Roos et al. |
| 2005/0194365 A1* | 9/2005 | Li .............................. 219/121.68 |
| 2006/0243712 A1 | 11/2006 | Haight et al. |
| 2007/0002453 A1 | 1/2007 | Munro |
| 2007/0026676 A1 | 2/2007 | Li et al. |
| 2007/0293057 A1 | 12/2007 | Chism |
| 2008/0143021 A1 | 6/2008 | Ehrentraut et al. |
| 2009/0045179 A1 | 2/2009 | Williams |
| 2010/0292679 A1 | 11/2010 | Hoff et al. |
| 2010/0296978 A1 | 11/2010 | Park et al. |

FOREIGN PATENT DOCUMENTS

| JP | 198684 | 6/2011 |
|---|---|---|
| WO | 8908529 | 9/1989 |

OTHER PUBLICATIONS

"Ultraviolet Poling of Pure Fused Silica by High Intensity Femtosecond Radiation" Corbari et al, ECOC 2005 Proceedings—vol. 2.*
"Towards nanostructuring with femtosecond laser pulses" Korte et al. Appl. Phys. A 77, pp. 229-235 (2003).*

(Continued)

*Primary Examiner* — Aaron Roane
(74) *Attorney, Agent, or Firm* — Paul C. Remus (57) ABSTRACT

A method and apparatus to produce controlled ablation of material through the use of laser pulses of short pulse widths at short wavelengths.

3 Claims, 7 Drawing Sheets

(56) References Cited

OTHER PUBLICATIONS

"Multi-photon electron emission from Cu and W: An angle resolved study" Damascelli et al. Phys. Rev. B vol. 54, No. 9 (1996).*
"Nano and microscale surface and subsurface modifications induced in optical materials by femtosecond laser machining." Malshe et al. Journal of Materials Processing Technology 149 (2004) pp. 585-590.*
"Ultraviolet Poling of Pure Fused Silica by High Intensity Femtosecond Radiation" Corbari et al, Applied Physics Letters (2005) 86 071106.*
"Ablation of Si and Ge Using UV Femtosecond Pulses" Herbst et al. (1996) Mat. Res. Symp. Proc. vol. 397.*
Abramowitz et al. Interaction of Photons with Silicon. Jun. 15, 2006. [retrieved on Jul. 9, 2010} Retrieved from the internet: <URL:http://micro.magnet.fsu.edu/primer/java/digitalimaging/ccd/quantum/index.html>.
Leonard et al. Highly Ordered Mesoporous and Hierarchically Nanostructured Mesomacroporous Materials for Nanotechnology, Biotechnology, Information Technology and Medical Applications—Nanopages 1 (2006) 1, 1-44, 2006 [retrieved on Jul. 9, 2010] Retrieved from the internet: <URL: http://www.fundp.ac.be/pdf/publications/59896.pdf>.
International Search Report for PCT/US2010/035130, dated Jul. 20, 2010.
Abramowitz at al. Interaction of Photons with Silicon. Jun. 15, 2006 [retrieved on Jul. 9, 2010] Retrieved from the Internet <URL: http://micro.magnet.fsu.edu/primer/java/digitalimaging/ccd/quantum/index.html>.
Leonard et al., Highly ordered Mesoporous and Hierarchically Nanostructured Mesomacroporous Materials for Nanotechnology, Biotechnology, Information Technology and Medical Applications—Nanopages 1 (2006) 1, 1-44 (retrieved on Jul. 9, 2010) Retrieved form the Internet: <URL http://www.fundp.ac.be/pdftpublications/59896.pdf>.
Corbrari et al., Ultraviolet Poling of Pure Fused Silica by High Intensity Femtosecond Radiation, Applied Physics Letters (2005)86, 071106.
Herbst et al., Ablation of Si and Ge Using Femtosecond Pulses, Mat. Res. Symp. Proc., vol. 397 (1996).
Corbrari et at, Ultraviolet Poling of Pure Fused Silica by High Intensity Femtosecond Radiation, ECOC 2005 Proceedings, vol. 2.
Korte el al., Towards Nanostructuring with femtosecond laser pulses, Appl. Phys., pp. 229-235 (2003).
Damascelli et al., Multi-photon electron emission from Cu and W: An angle resolved study, Phys. Rev. B, vol. 54, No. 9 (1996).
Malshe et al, Nano and microscale surface and subsurface modifications induced in optical materials by femtosecond laser machining, J. of Mat. Processing Tech., 149 (2004) pp. 585-590.
Itina et al., Nonlinear fluence dependencies in femtoseoond laser ablation of metals and dielectric materials, Optical Eng., 44(5), 051109. (May 2005).
Zimmer at al., Precise etching of fused silica for micro-optical applications, App. Surface Sci., 243 (2005) 415-420.
Hashida et al, Non-thermal ablation of expanded polytetrafluorethylene with an intense femtosecond-pulse laser, Optics Express, 13116-13121, vol. 17, No. 15, Jul. 20, 2009.
Schaffer. Chris B. Thesis, Interaction of Femtosecond Laser Pulses with Transparent Materials. Dept. of Physics—Harvard University, May 2001.
Zhang et al., Direct photoetching of single crystal SiC by VUV-266 nm multi-wavelength laser ablation, Appplied Physics A 64:367-371, 1997.
Shinoda at al, Femtosecond laser-induced formation of nanometer-width grooves on synthetic single-crystal diamond surfaces, J. of Appl. Phys., 105: 053102-4, 2009.
Das et al., A review of the electrical characteristics of metal contacts on diamond, Thin Solid Films 212: 19-24, 1992.
Nam et al., Impact of backside via dimension changes on high frequency GaAs MMIC Circuit Performance, 2003 Intnl. Conf. on Cmpd. Semiconductor Mfg.
Glebov, Leonid B., Volume Diffractive Elements in Photosensitive Inorganic Glass for Bean Combining, Center for Research and Education in Optics and Lasers, SSDLTR, 2001.
Ciapurin et al. Spectral Beam combining by PTR Bragg gratings, Center for Research and Education in Optics and Lasers, SSDLTR 2003.
Smirnov et al, Chirped bulk Bragg gratings in PTR glass for uttrashort pulse stretching and compression, Center for Research and Education in Optics and Lasers, SSDLTR 2005.
Glebov et al., Interaction of photo-thermo-refractive glass with nanosecond pulses at 532 nm, Laser Induced Damage in Optical Materials, 2003, Proceedings of SPIE, vol. 5273.
Glebov at al.. New Approach to robust optics for HEL systems. Laser Weapons Technology III, Proceedings of PSI, vol. 4724 (2002).
Zoppel et al. "Laser micro machining of 3C-SIC single crystals" Microelectronic Engineering 83 (2006) pp. 1400-1402.
Park et al. "Precision micromachining of CVD diamond films" Diamond and Related Materials 9 (2000) pp. 1154-1158.

* cited by examiner

Chromium (350nm): κ ~ 2.66 d = (λ/4πηκ)
  = (350/(4* 3.14*2.6*2.66)
  ≠ ~4.0 nm

Gold (350nm): κ ~ 1.9

FIG 7 d = (λ/4πηκ)
 = (350/(4* 3.14*1.7*1.9)
 = ~8.5 nm

Silver (350nm): κ ~ 1.6

FIG 8

$d = (\lambda/4\pi\eta\kappa)$
$= (350/(4* 3.14*0.3*1.6)$
$= \sim 5.1$ nm

METHOD AND APPARATUS FOR CONTROLLED LASER ABLATION OF MATERIAL

CROSS-REFERENCE TO RELATED APPLICATIONS

The present application claims the benefit of Provisional Patent Application Ser. No. 61/216,306 filed May 15, 2009, which is incorporated herein by reference.

TECHNICAL FIELD OF THE INVENTION

The present invention relates to a method and apparatus for laser ablation of material. More specifically, it relates to a method and apparatus for controlled laser ablation through the use of short pulses of laser light at ultraviolet wavelengths.

BACKGROUND OF THE INVENTION

Silicon is the most widely used material for substrates of integrated circuits and forms the basis of the modern semiconductor industry. The processing of dielectric materials, primarily silicon and doped silicon, using chemical or plasma etching techniques, is a mature technology, developed mainly for the microelectronics sector. These "conventional" processes produce exceptional results for digital CMOS circuitry. However, MEMS devices, which are also fabricated on silicon, are analog devices that require much tighter spatial control and depth control than the digital CMOS circuitry.

Conventional chemical or plasma etching techniques lack the spatial control needed for high performance MEMS devices. Although the conventional etch process starts on an area having a selected diameter, the effect of the etch process extends beyond the etch dimension beyond the desired area, leading to reduced control of the material removal process.

In the early prior art of laser ablation, lasers are used to provide a directed source of radiation whose deposited laser energy leads to the thermal heating of the substrate. However, there are many situations where heating is not desired and is, in fact, harmful. In these situations, such lasers may not be used. For example, long wavelength lasers, such as infrared lasers, which cut by heating a material substrate rather than by controlled photochemical ablation, are normally not desirable for etching since the etched region undergoes heating effects leading to uncontrolled melting.

Short pulse width infrared lasers exhibit some improvement in the control of the etch process as pulse width is reduced. For example, U.S. Pat. No. 5,656,186, Morrow et al. describes a laser with a pulse width of 100 fs to 1 ps at a 800 nm wavelength. See also, U.S. Pat. Nos. 7,560,658, 7,649,153 and 7,671,295. Now laser ablation using short pulses at long wavelength typically involves Ti:Sapphire (Ti:AlO$_3$) lasers with pulses of 100 fs (0.1 ps) at a wavelength of 800 nm. The 100 fs pulse avoids phonon-phonon or electron-phonon coupling, which begins to occur at about 1.0 ps, but requires threshold intensities in excess of $10^{13}$ W/cm$^2$ with a per pulse ablation depth of 300-1,000 nm. This per pulse ablation depth is greater than the thickness of many microcircuit layers, which is an uncontrolled event for microcircuit processing.

Alternatively, long pulse width, short wavelength lasers etch materials efficiently, but the etch process is still not adequately controlled. See, e.g., U.S. Pat. Nos. 4,925,523 and 7,469,831. The laser deposits energy in a layer close to the surface of the material to be etched. A molten area forms leading to vaporization of the surface. The vapor pressure of the material aids removing the material by expulsion. Strong shock waves of the expulsion can lead to splatter, casting of material, and thermal cracking of the substrate, which interferes with the clean removal of the material.

This laser ablation using long pulses at short wavelength typically involves UV KrF excimer lasers, or similar ultraviolet lasers, with pulses of 1.0 ns or longer at a wavelength of 248 nm. However, this technique produces uncontrolled ablation with spalling and cratering. The uncontrolled ablation is a result of heating and melting of the material to be ablated beyond the laser spot size due to thermal (phonon-phonon) coupling during the laser pulse.

Thus, current technologies for laser ablation of materials use either long pulses at short wavelength or short pulses at long wavelength. Both technologies have significant short comings as described above. It is, therefore, desirable to ablate materials using lasers that have a short pulse length at a short wavelength. Such lasers remove material without undue heating or damage to the areas surrounding the laser sport and have the depth control desired. The ablation mechanism is different than that of the prior art.

Thus, a method and apparatus for controlled laser ablation of material is needed that avoids the spalling from longer pulses (>1.0 ps) and the excessive ablation from longer wavelengths. It is a goal of the present invention to achieve such controlled ablation through lowering the threshold intensity required for ablation in materials such as silicon; materials with crystalline substrates similar to silicon, defined herein as silicon nitride, silicon oxide, gallium arsenide, indium phosphide or sapphire; metals; or metal oxides.

SUMMARY

The present invention is a method and apparatus to utilize lasers to produce short pulses, 500 fs or less, at short wavelengths, 350 nm or less, for use in controlled ablation in silicon, materials with crystalline substrates similar to silicon, metals and metal oxides.

BRIEF DESCRIPTION OF THE DRAWINGS

These and other features and advantages of the present invention will be better understood by reading the following detailed description of preferred embodiments, taken together with the drawings wherein.

DETAILED DESCRIPTION OF PREFERRED EMBODIMENTS

Figure 1:
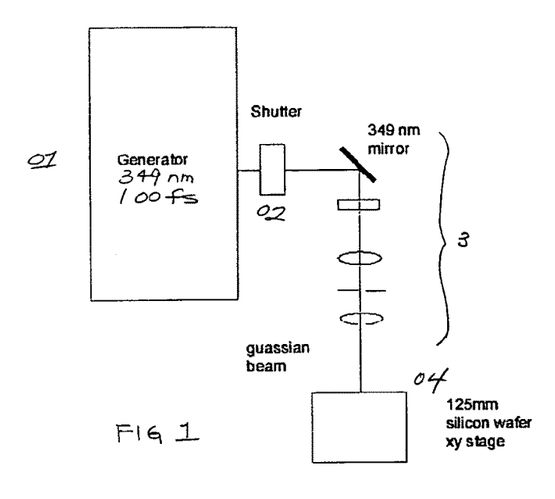
FIG. 1 is a drawing of a preferred embodiment of the present invention.

The present invention is a method and apparatus to utilize lasers with short pulse widths at short wavelengths to produce controlled ablation of material. It should be noted that the term laser as used herein includes frequency shifted laser systems. As shown in FIG. 1, a preferred embodiment of the present invention uses a frequency tripled Yb:KYW (ytterbium ions in a lattice of potassium yttrium tungstate) laser 01 as the means for producing 100 fs pulses at a wavelength of 349 nm. It also includes a shutter 02 and an arrangement of one or more mirrors and lens 03, known to those skilled in the art, to focus a Gaussian beam on a silicon wafer 04. Also, other means known to those skilled in the art may be used to produce laser pulses with short pulse widths at short wavelengths.

This embodiment produces a measured ablation threshold intensity of $5.0 \times 10^{10}$ W/cm$^2$ (versus $10 \times 10^{13}$ W/cm$^2$ in the prior art) and a per pulse ablation depth of 5.8 nm (versus 300-1,000 nm in the prior art). It also produces a vertical sidewall angle of 86 degrees for a repetitive laser ablation of 15,000 pulses.

The advantages of this embodiment are shown in machining silicon. At an 800 nm wavelength, silicon has an indirect band gap absorption and requires lattice vibration (phonon coupling) for photon absorption. This requires 4 photons for 1 free electron.

Figure 2:
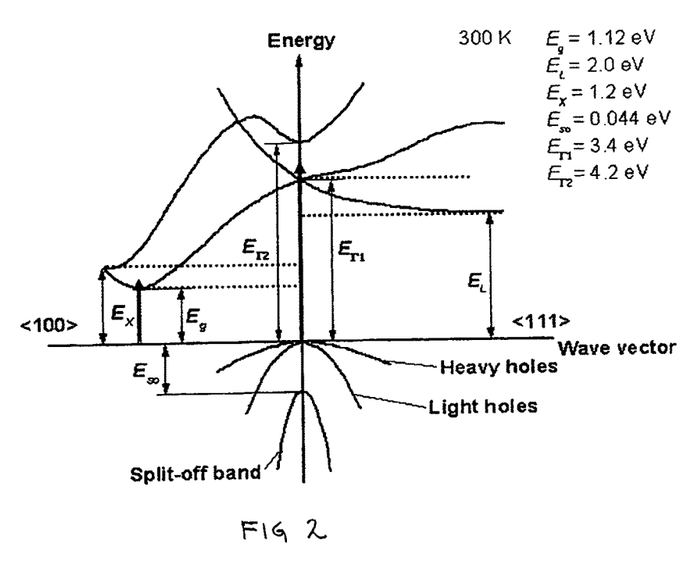
FIG. 2 is a drawing of the band gap structure of silicon.
Figure 3:
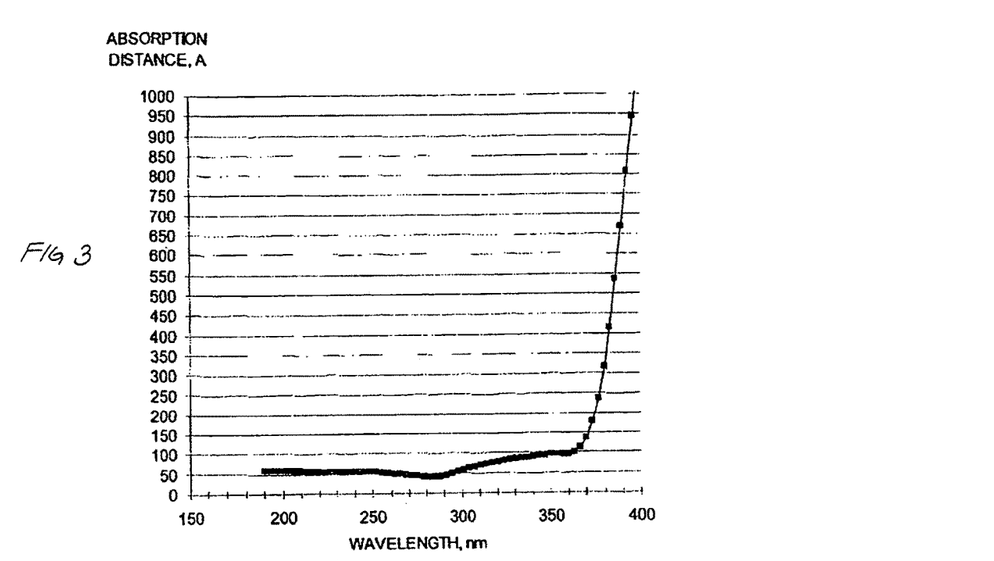
FIG. 3 is a plot of the absorption distance versus wavelength of laser pulses in silicon.
Figure 4:
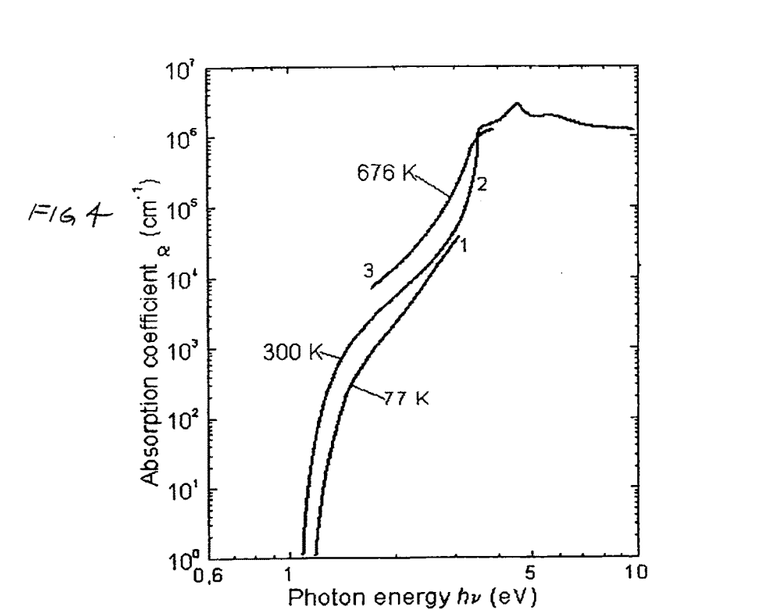
FIG. 4 is a plot of the absorption coefficient versus the photon energy of photons in silicon.

Below a wavelength of 360 nm silicon has a direct band gap absorption, as shown in FIG. 2. The absorption depth at a wavelength of 350 nm is 10 nm. This absorption depth for single photon energy deposition plunges by an order of magnitude moving from a wavelength of 400 nm to one of 360 nm as shown in FIG. 3 which shows the onset of direct band gap absorption. FIG. 4 shows the absorption coefficient for photons at 350 nm (3.55 eV) and at 800 nm (1.55 eV). At wavelengths of 350 nm electrons are excited from the valence band to a very high energy state in the conduction band within a 10 nm (100 A) absorption depth as shown in FIG. 4. These highly placed electrons can be photoionized (excited to a free ion state) by absorbing another photon (1 free electron for 2 photons) or can exchange energy with a valence band electron to end up with two lower energy conduction band electrons, each of which can be photoionized in a single step (3 free electrons for 2 photons).

At intensities less than ~$10^{11}$ W/cm$^2$ the excited electron density grows to the critical density for silicon plasma frequency, $n_e$~$8.9 \, 10^{21}$/cm$^3$. Absorption then proceeds by a classic free carrier absorption model, but the absorption depth is now determined by the material parameters. It is estimated that the main burst of energy will be absorbed in ~8 nm with an energy absorption of 10-30 kJ/cm$^3$. At this point, the energetic electrons leave the silicon and a Coulombic explosion follows. In other words, when electrons become energetic enough, they will leave the material surface leaving behind positively charged ions that then fly apart due to electrostatic forces. This creates a shock that blows away the material without any melting.

Figure 5:
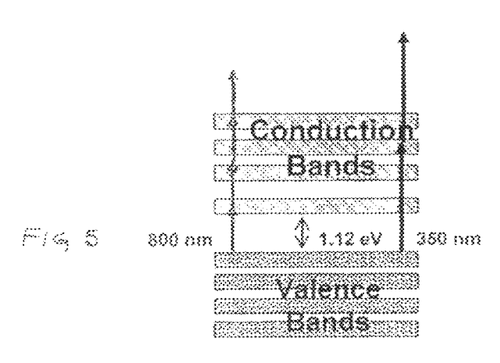
FIG. 5 is a pictorial representation of the excitation of electrons in silicon.
Figure 6:
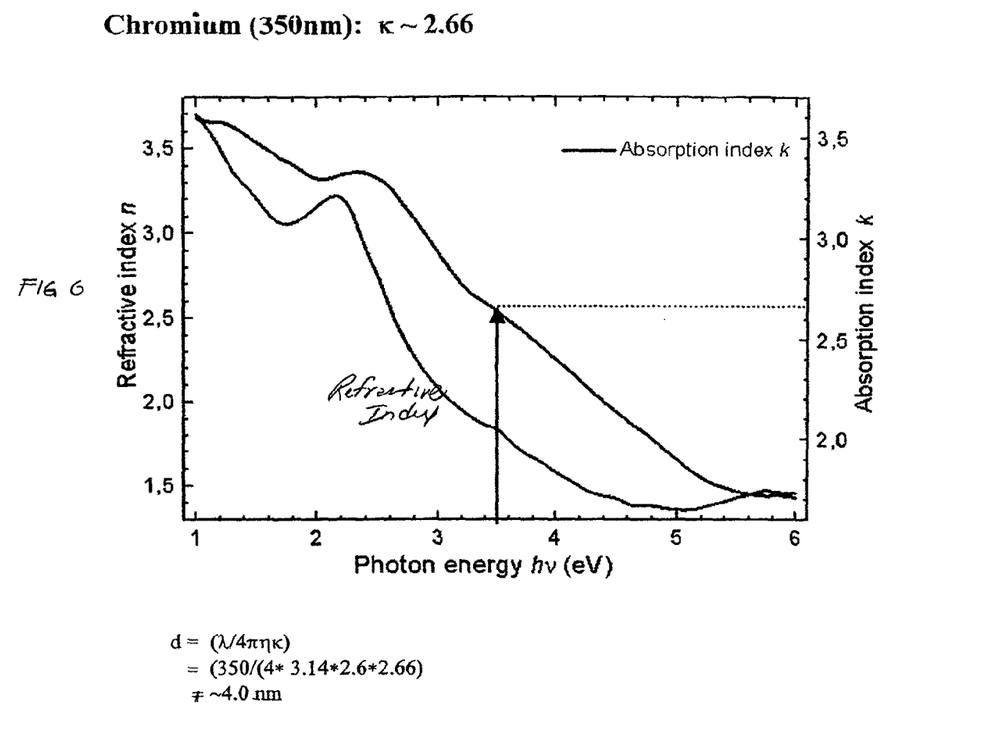
FIG. 6 is a plot of both the refractive index and the absorption index versus the photon energy of a photon in chromium.
Figure 7:
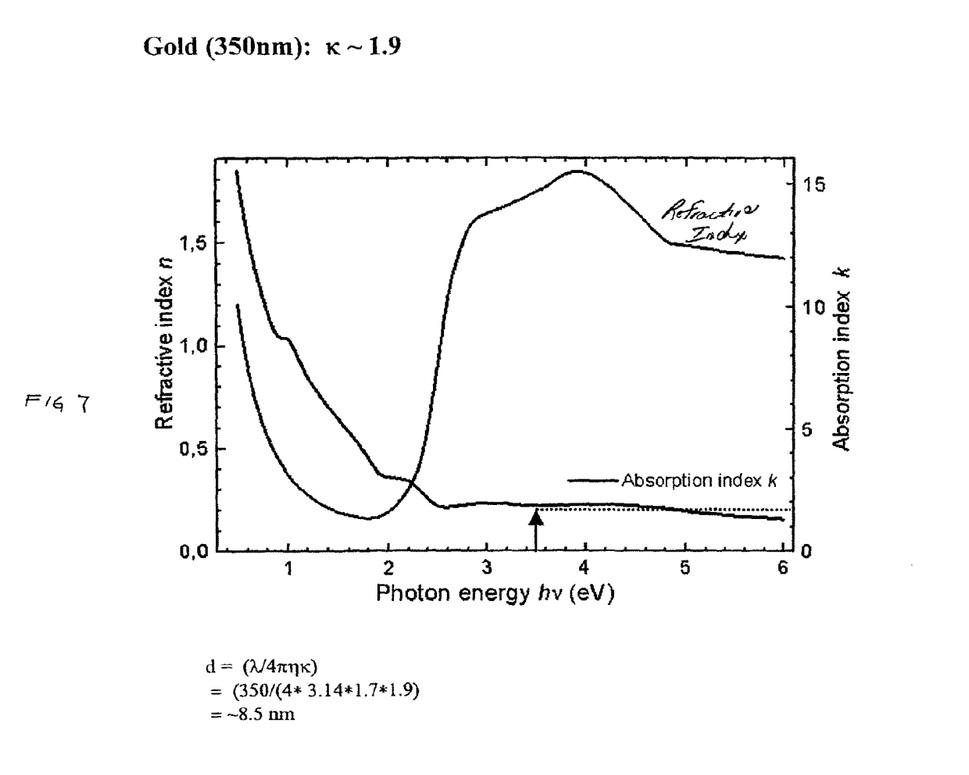
FIG. 7 is a plot of both the refractive index and the absorption index versus the photon energy of a photon in gold.
Figure 8:
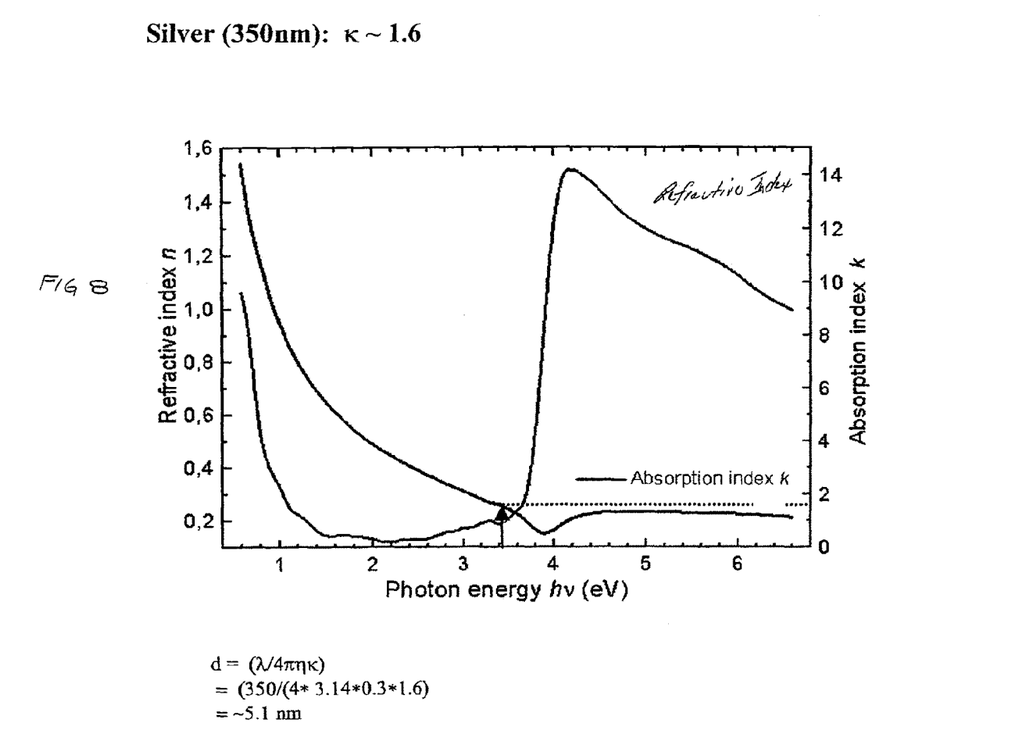
FIG. 8 is a plot of both the refractive index and the absorption index versus the photon energy of a photon in silver.

Similar results occur in certain metals. As shown in FIG. 5 for chromium, a photon at a wavelength of 350 nm has an energy (eV) and related absorption index (2.66) that results in an absorption depth of ~4.0 nm. As shown in FIG. 6 for gold, a photon at a wavelength of 350 nm has an energy (eV) and related absorption index (1.9) that results in an absorption depth of ~8.5 nm. As shown in FIG. 7 for silver, a photon at a wavelength of 350 nm has an energy (eV) and related absorption index (1.6) that results in an absorption depth of ~5.1 nm.

Thus, this embodiment of the present invention lowers both ablation thresholds and ablation depth/pulse by a factor of $10^2$ as compared to an 800 nm laser. This results in no damage to underlying crystal structure or surrounding area. Moreover, material removal features are very controllable as both very high rates of material removal and very fine features are possible.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A. method for controlled laser ablation of silicon comprising,
    applying a first photon to silicon with a frequency shifted solid state Ytterbium laser without any other lasers to excite an electron to move from the valence band to the conduction band;
    applying a second photon to silicon with a frequency shifted solid state Ytterbium laser without any other lasers to excite the electron from the conduction band to a free state, wherein the first and second photons are generated using a single laser pulse in pulse widths of 500 fs or shorter at wavelengths of 350 nm or shorter, wherein each of the laser pulses has an intensity of $10^{11}$ W/cm$^2$ or less; and
    producing a laser ablation depth of 10 nm or less per laser pulse.

2. A method for controlled laser ablation of silicon comprising,
    applying a first photon to silicon with a frequency tripled Ytterbium-doped Potassium Yttrium Tungstate (Yb:KYW) laser without any other lasers to excite an electron to move from the valence band to the conduction band;
    applying a second photon to silicon with a frequency tripled Ytterbium-doped Potassium Yttrium Tungstate (Yb:KYW) laser without an other lasers to excite the electron from the conduction band to a free state, wherein the first and second photons are generated using a single laser pulse in pulse widths of 500 fs or shorter at wavelengths of 350 nm or shorter, wherein each of the laser pulses has an intensity of $10^{11}$ W/cm$^2$ or less; and
    producing a laser ablation depth of 10 nm or less per laser pulse.

3. The method for controlled laser ablation of silicon of claim 1, further comprising the step of ablating an area ranging from 100 μm by 100 μm.

* * * * *